(12) United States Patent
Bernardi

(10) Patent No.: US 6,176,258 B1
(45) Date of Patent: Jan. 23, 2001

(54) DUAL CAM DRIVE FOR WATER CONDITIONER VALVE

(75) Inventor: Walter Bernardi, Highland Park, IL (US)

(73) Assignee: United States Filter Corporation, Palm Desert, CA (US)

( * ) Notice: Under 35 U.S.C. 154(b), the term of this patent shall be extended for 0 days.

(21) Appl. No.: 09/069,916

(22) Filed: Apr. 30, 1998

(51) Int. Cl.[7] .................................................. F16K 11/06
(52) U.S. Cl. ............... 137/554; 137/624.14; 137/624.18; 251/248
(58) Field of Search ............................. 137/554, 624.13, 137/624.14, 624.18, 624.21; 251/248, 252, 129.11

(56) References Cited

U.S. PATENT DOCUMENTS

| | | | |
|---|---|---|---|
| 2,310,978 | 2/1943 | McGill et al. ........................... | 210/24 |
| 3,278,424 | 10/1966 | Griswold ................................ | 210/35 |
| 3,457,792 | 7/1969 | Fleckenstein ......................... | 74/3.52 |
| 3,732,738 | 5/1973 | Grout ..................................... | 74/3.52 |
| 3,874,412 | * 4/1975 | Fleckenstein et al. .......... | 137/624.13 |
| 3,926,071 | 12/1975 | Elliot ...................................... | 74/567 |
| 4,298,025 | * 11/1981 | Prior et al. ....................... | 137/624.14 |
| 4,313,825 | 2/1982 | Fleckenstein et al. ................ | 210/89 |
| 4,632,150 | 12/1986 | Gagas ................................ | 137/625.31 |
| 5,022,994 | * 6/1991 | Avery et al. ..................... | 137/624.14 |
| 5,174,337 | 12/1992 | Dahlen et al. .................. | 137/625.29 |
| 5,590,687 | * 1/1997 | Vaughan ........................... | 137/624.13 |

* cited by examiner

Primary Examiner—A. Michael Chambers
(74) Attorney, Agent, or Firm—Greer, Burns & Crain, Ltd.

(57) ABSTRACT

A water conditioner valve includes a main housing configured for providing fluid communication between a plurality of locations, and having first and second valve chambers, a main piston mounted for reciprocal movement in the first valve chamber and having a main piston rod attached thereto, the main piston rod provided with a main cam follower; a supplemental piston mounted for reciprocal movement in the second valve chamber and having a piston rod attached thereto, the supplemental piston rod provided with a supplemental cam follower; the valve also having a cam member having an axis of rotation, a first cam track for receiving the main cam follower, and a second track for receiving the supplemental cam follower, the cam tracks being constructed and arranged on the cam member so that rotation of the cam member will cause movement of the pistons along a linear axis which is parallel to the axis of the cam member for controlling the relative positions of the pistons in the respective chambers to obtain the desired fluid flow. When used as a valve in a water conditioning apparatus with a regeneration cycle, the supplemental piston is a brine piston which controls eduction and fast rinse steps.

22 Claims, 9 Drawing Sheets

TO BRINE TANK

FROM SOFT OUT

DUAL CAM DRIVE FOR WATER CONDITIONER VALVE

BACKGROUND OF THE INVENTION

The present invention relates to a control device for controlling reconditioning of a liquid treatment system, in particular regeneration of a water conditioning or softening apparatus having a control valve with a first or main piston and a second or brine piston.

Conventional liquid treatment apparatus, such as water softeners, require periodic regeneration of the resin bed used to treat the incoming raw water to obtain soft water. Typically, in a stage known as eduction, a brine solution is passed through the resin bed to chemically recharge the resin. The resin is then rinsed with raw water to remove any traces of the brine. In some cases, the eduction step is preceded by a backwash step, in which the flow of incoming water is reversed to remove sediment which has been separated from the water during the conditioning operation and which may interfere with the softening operation. The latter are known as "five cycle" systems, wherein regeneration involves a backwash, a brine rinse, a slow rinse a fast rinse and a refilling of the brine tank. The length of time consumed by each of the steps in the regeneration cycle is a factor of the condition of the raw water being treated.

As is well known in the art, water softeners are provided with various mechanisms for initiating regeneration. Some of such mechanisms are clock operated, and are triggered to begin at a preset time of day, while others are triggered by a threshold volume of treated water. Still other mechanisms trigger regeneration by a condition of the resin bed.

Conventional water conditioner control valves employ separate pistons for controlling the main flow of the raw water between source, the treatment tank and the drain on the one hand, and between the treatment tank, the brine tank and the drain on the other. Some such valves are also provided with cam mechanisms for controlling the position of at least one of the pistons.

A main drawback, however of conventional softener control valves is that the piston rods of such valve pistons are biased against the cam motion by spring force. Over time, the spring force changes, reducing the accuracy and efficiency of the operation of the valve. In other applications, the cam rotates transversely to the longitudinal axis of motion of the pistons, and a relatively complex mechanical linkage is required to transfer the piston movement instructions from the cam.

Another drawback of conventional water conditioner valves is that the existing cam surfaces have dwell points which do not accommodate the inertia of a driving motor. More specifically, conventional water conditioner valve control systems employ an electric motor to rotate the cam, which then causes desired regeneration movement of the valve pistons. During the regeneration cycle, the motor stops at varying intervals while certain operations of the cycle are performed. Once the signal is generated to stop the motor, the internal gears and linkages of the motor have some inherent inertia, which causes the motor to turn slightly after being turned off. In some cases, this inertial movement can cause unwanted movement of the cam, and consequential disruption of the regeneration cycle.

The configuration of conventional cam dwell points has been ineffectual in solving this problem. The length of prior art cam dwell points has also been inadequate, in that the switch signals for operating the motors have a designated duration. Depending on the speed of the motor, if the dwell point is too short, there may be insufficient time to receive the entire signal for directing the motor to cease rotation.

Still another problem of conventional water conditioner control valves is that they are inefficient because the duration of the fast rinse portion of the regeneration cycle is a function of the brine tank refill time.

Accordingly, a first object of the present invention is to provide an improved water conditioner control valve which positively controls the operation of the main and brine pistons in both operational directions.

Another object of the present invention is to provide an improved water conditioner control valve which does not require extensive linkages to translate the rotational movement of the cam into linear displacement of the main and brine pistons.

Yet another object of the present invention is to provide an improved water conditioner control valve in which cam dwell points are configured to accommodate motor inertial movement after motor shut down.

BRIEF SUMMARY OF THE INVENTION

The above-listed objects are met or exceeded by the present dual cam drive for a water conditioner valve, which features a cam member with separate cam tracks for a main piston and a brine piston, each piston having a respective rod with a cam follower configured to engage a respective one of the cam tracks. Thus, the axial reciprocal motion of the main and brine pistons is totally controlled by the cam member in both directions of motion. In addition, the cam tracks are provided with dwell points or flat spots which are configured to accommodate motor inertia as well as extended switch signals. Another feature is that the cam member also has switch cams which are in registry with corresponding dwell points on the cam tracks, so that the cam member coordinates the position of the pistons with the electronic valve control system. When used as a valve in a water conditioning apparatus with a regeneration cycle, the brine piston is configured to control the fast rinse cycle, and consequently increases flow rates through the system.

More specifically, the present invention provides a water conditioner valve including a main housing configured for providing fluid communication between a plurality of locations, and having first and second valve chambers. A main piston is mounted for reciprocal movement in the first valve chamber and has a main piston rod attached thereto, the main piston rod provided with a main cam follower. Similarly, a supplemental piston is mounted for reciprocal movement in the second valve chamber and has a piston rod attached thereto, the supplemental piston rod provided with a supplemental cam follower. The valve also has a cam member having an axis of rotation, a first cam track for receiving the main cam follower, and a second track for receiving the supplemental cam follower, the cam tracks being constructed and arranged on the cam member so that rotation of the cam member will cause movement of the pistons along a linear axis which is parallel to the axis of the cam member for controlling the relative positions of the pistons in the respective chambers to obtain the desired fluid flow.

In another embodiment, the present invention provides a water conditioner valve for a water conditioning device having a regeneration cycle including service, backwash, eduction, fast rinse and refill components. The valve includes a main housing configured for providing fluid communication between a raw water supply, a treatment tank, a brine tank and a drain, the housing having a main valve chamber and an eductor body. A main piston is mounted for reciprocal movement in said main valve chamber, and a brine piston is mounted for reciprocal movement in the eductor body. A control system is provided for manipulating the pistons in the respective chamber and body to achieve the desired fluid flow to complete the regeneration cycle. The brine piston is configured to perform at least the eduction and the fast rinse steps of the cycle.

DETAILED DESCRIPTION OF THE INVENTION

Figure 1:
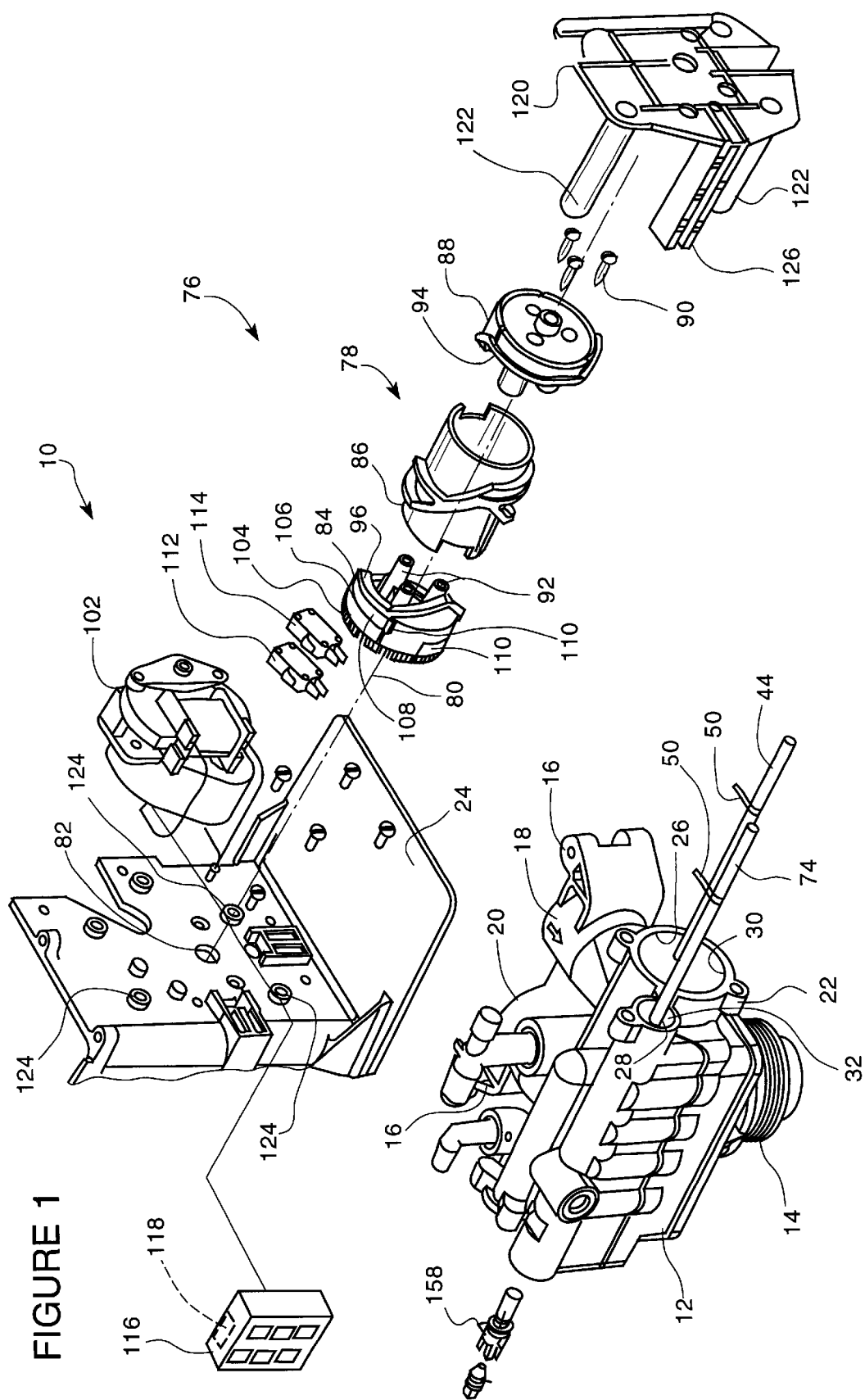
FIG. 1 is an exploded top perspective view of the present water conditioner control valve.

Referring now to FIG. 1, the present water conditioner control valve is generally indicated at 10, and includes a valve housing 12 with a lower threaded coupler 14 configured for attachment in a known manner to a water conditioner resin or treatment tank (not shown). A suitable resin tank is described in commonly-assigned U.S. Pat. No. 5,174,466, which is incorporated by reference.

The housing 12 is preferably made of injected molded plastic, and as such is made of several pieces joined together by vibration or hot plate welding, or chemical adhesive to create a series of water communication galleries between the water source, a brine tank (not shown), a drain (not shown) and the resin tank, as is well known in the art. In addition, the housing 12 is configured to accept a bypass valve (not shown) which is mounted to a pair of hinge-like mounting assemblies 16. One of the assemblies 16 is located adjacent a raw water inlet 18, which is connected, through the bypass valve, to a source of raw water, typically the main water supply line of a residence or building. The other of the assemblies 16 is located adjacent the treated water outlet 20 through which water which has been conditioned in the treatment tank is fed to the plumbing fixtures of the residence or building.

A control end 22 of the housing 12 is fastened to a mounting plate 24, and also is the location for outlets 26, 28, respectively, of a main chamber 30, also called a first valve chamber, and an eductor body 32, also called a second valve chamber or a brine chamber. The main chamber 30 and the eductor body 32 are oriented generally horizontally in the housing 12, have parallel longitudinal axes and are closed at ends opposite the outlets 26, 28.

Figure 4:
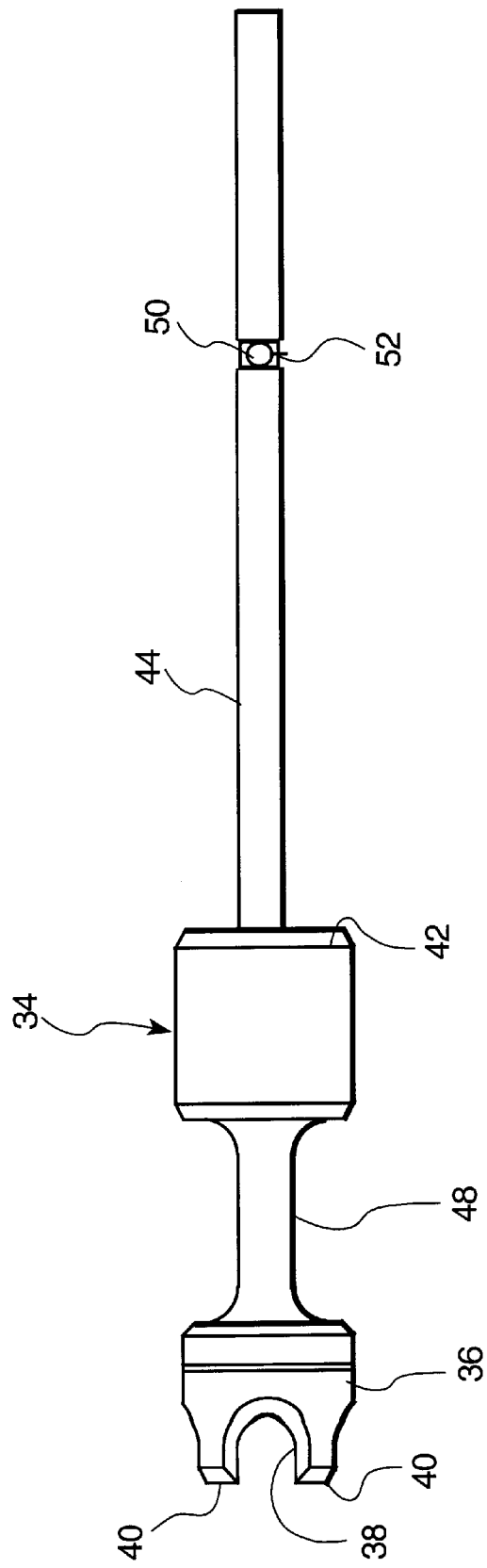
FIG. 4 is an overhead plan view of the main piston of the present control valve.

Referring now to FIGS. 1 and 4, a main piston 34 is mounted for reciprocal movement in the main chamber 30 and has a blind end 36 having at least one u-shaped passageway 38 defined by a pair of legs 40 which contact the closed end of the chamber 30 in some positions. Opposite the blind end 36 is a rod end 42 to which is attached a piston rod 44. Both the rod end 42 and the blind end 36 have a specified diameter which is dimensioned to sealingly and slidingly engage "T"-shaped seal rings 46 (graphically shown in FIG. 5) for selective opening and closing of valve passages, as will be described below in greater detail in relation to FIGS. 5–9. Between the blind end 36 and the rod end 42 is a central portion 48 of relatively narrowed diameter for promoting the passage of liquid.

The piston rod 44 has a transverse pin 50 mounted in a bore 52. As will be described below, the transverse pin 50 is configured to be a cam follower which will be used to control the linear reciprocal movement of the main piston 34 in the main housing 30.

Figure 5:
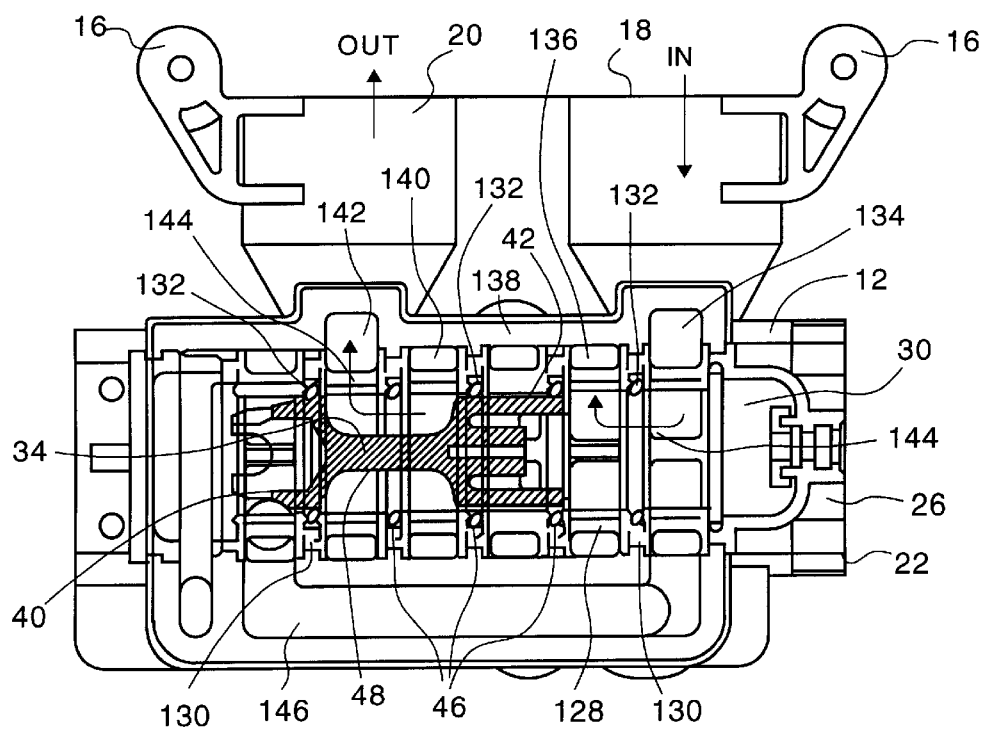
FIG. 5 is a fragmentary sectional view of the present water conditioner control valve in the service position.
Figure 5:
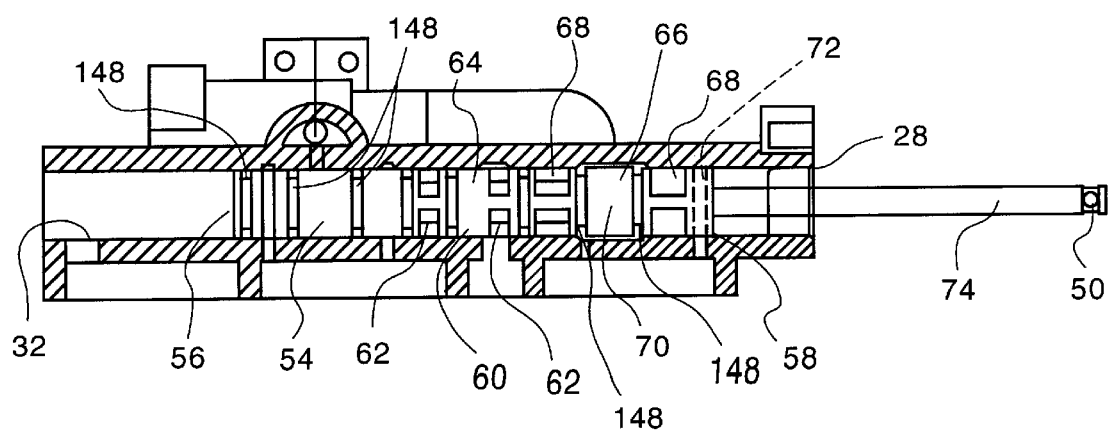

Referring now to FIGS. 1 and 5, a brine piston 54 is configured for linear reciprocal movement in the eductor chamber 32 and also has a blind end 56 and a rod end 58. In comparison to the main piston 34, the brine piston 54 has a smaller diameter, which also reflects the relatively smaller diameter of the eductor body 32. Like the main piston, the brine piston 54 is closed at the blind end, but is otherwise hollow. The brine piston 54 has a first portion 60 closer to the blind end 56 configured for implementing an eduction step. To this end, two peripheral bands of relatively smaller eductor openings 62 are axially spaced apart by a spacer portion 64. A second portion 66, located nearer the rod end 58 is configured for implementing a fast rinse step. A pair of peripheral bands of relatively larger rinse openings 68 are spaced apart axially by a spacer band 70.

The rod end 58 has a disk-like end plug 72 (shown hidden) configured with a treaded counterbore (not shown) for receiving an end of a brine piston rod 74. Like the main piston rod 44, the brine piston rod 74 has a transverse cam follower pin 50 affixed thereto.

Referring now to FIG. 1, in the preferred embodiment, the mounting plate 24 provides the location for an interface between the housing 12 and the piston rods 44, 74, and a valve control system, generally designated 76. For the purposes of the present invention, the main component of the control system 76 is a cam member 78, which is generally cylindrical in shape, with a central axis of rotation 80. The cam member 78 is provided with an axially extending mounting boss 81 (best seen in FIG. 2) which engages an opening 82 in the mounting plate 24.

Figure 2:
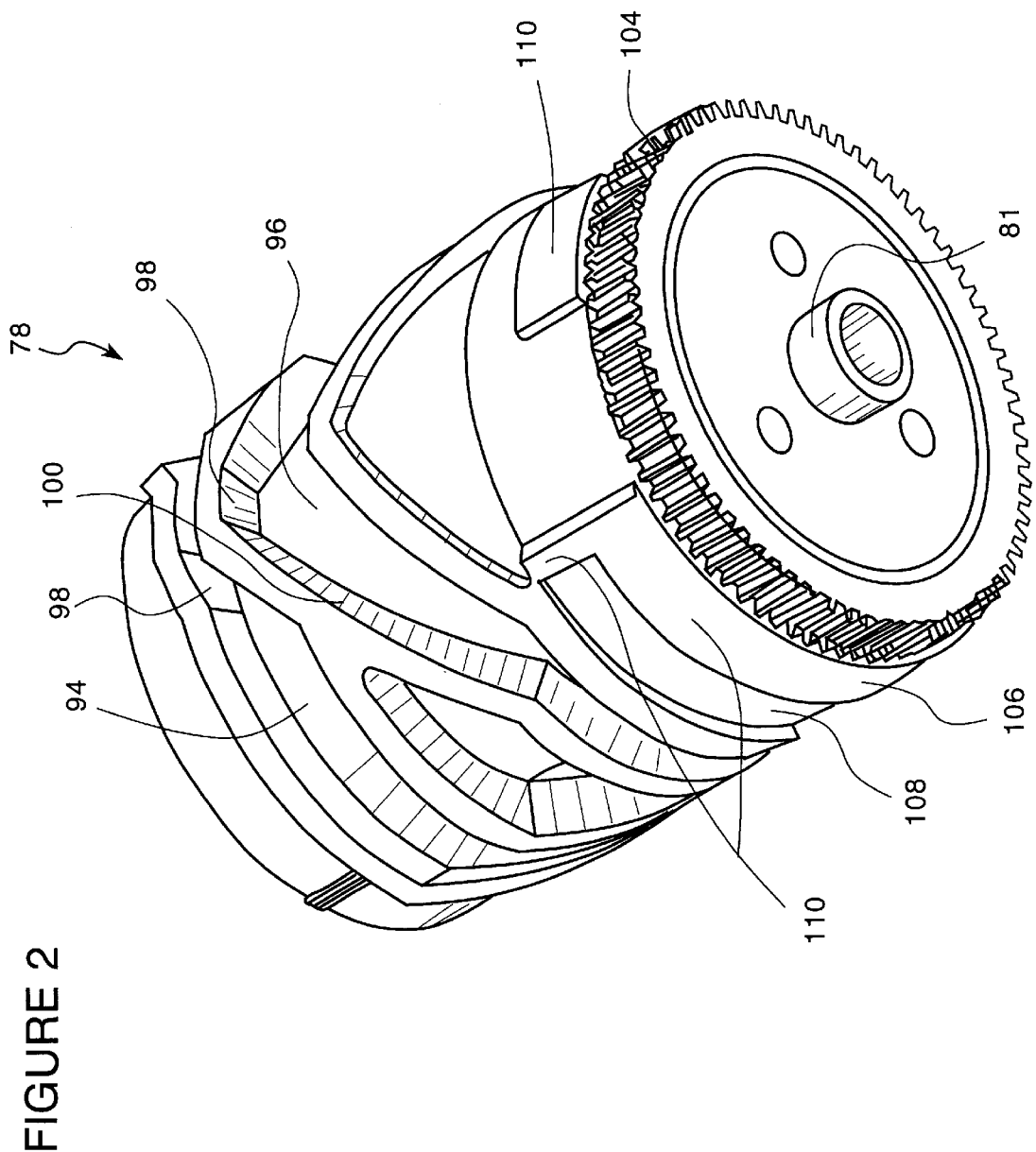
FIG. 2 is an assembled perspective view of the present cam member.
Figure 3:
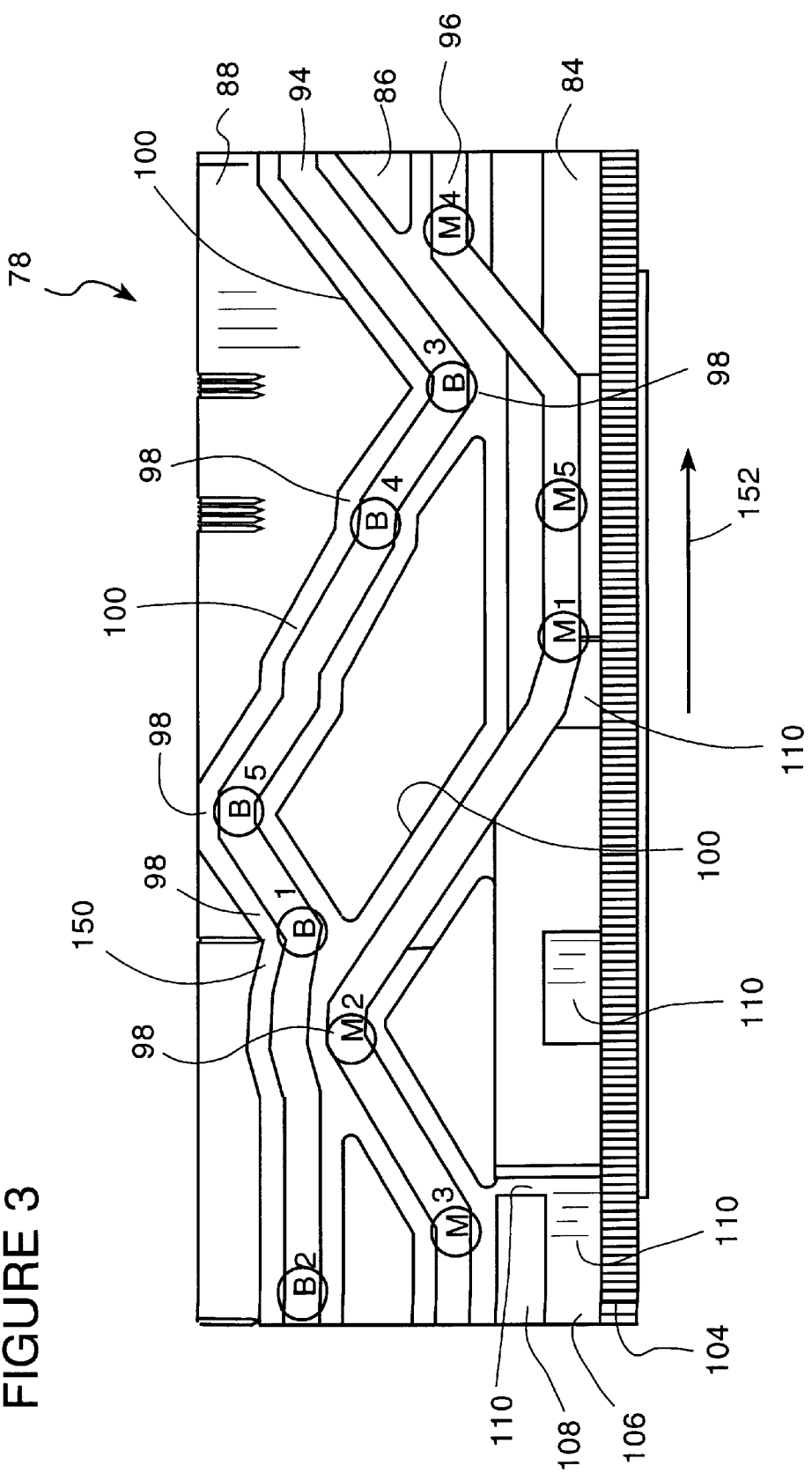
FIG. 3 is a two-dimensional view of the peripheral cylindrical surface of the cam member of FIG. 2 depicting the cam tracks.

Referring now to FIGS. 1–3, preferably made of three components to facilitate injection molding, the cam member 78 includes a base portion 84, a mid portion 86 and a top portion 88. The member 78 is assembled through the use of threaded fasteners 90 which pass through the top portion 88 and engage counterbored bosses 92 in the base portion 84.

A main feature of the cam member 78 is that it is provided with a pair of cam tracks designated a brine cam track 94 and a main cam track 96. Each of the cam tracks 94, 96 is configured for receiving a corresponding one of the cam follower pins 50 of the brine piston 54 and the main piston 34. The cam tracks 94, 96 are constructed and arranged on the cam member 78 so that rotation of the cam member will cause movement of the pistons 34, 54 along a linear axis which is parallel to the axis of the cam member for controlling the relative positions of the main piston and the brine piston in the respective chambers 30, 32 to obtain the desired fluid flow. An important feature of this structure is that the engagement of the cam follower pins 50 in the respective cam tracks controls movement of the corresponding pistons in both forward and reverse linear reciprocating directions.

In appearance, each of the cam tracks 94, 96 is defined by generally parallel pairs of radially-projecting lips which are integrally formed with the cam member 78. Further, each cam track 94, 96 is made up of a plurality of flat spots or dwell points 98, which are separated by inclined portions 100. The angle of inclination of the portions 100 is determined by balancing the load on a driving motor 102, the force of the water pressure, and seal friction. In the preferred embodiment, the angle of inclination is approximately 45°.

Referring now to FIGS. 1–3, at the base portion 84 of the cam member is provided a ring of gear teeth 104 which are configured to mesh with a pinion gear (not shown) of the motor 102. The motor 102 is mounted to the mounting plate 24 with threaded fasteners or other conventional technology. Also included on the base portion 84 of the cam member 78 is at least one, and preferably two annular switch cam tracks 106, 108. These cam tracks are preferably placed immediately adjacent the gear teeth 104, and each track consists of at least one and in one track several circumferentially spaced, raised, radially extending bosses or cams 110.

The lowermost switch cam track 106 is constructed and arranged to operationally engage a program switch 112, and the adjacent switch cam track 108 is constructed and arranged to operationally engage a homing switch 114. Both the program and the homing switches 112, 114 are preferably micro switches which are also mounted to the mounting plate 24 in operational proximity to the cam member 78 so that actuators (not shown) on the switches will be periodically tripped by the respective cams 110.

In function, the program switch 112 is connected to an electronic control system 116 (shown diagrammatically in FIG. 1) for stopping the cam member 78 at specific regeneration and service cycle points, and the homing switch 114 is connected to the system for generating a signal to the system when the cam member is in one of a service position and a regeneration position. In other words, the homing switch 114 is in one state (activated or inactivated) for service, and another for regeneration.

In operation, the cam member 78 rotates about its longitudinal axis under the control of the motor 102. The motor 102, in turn is controlled by the electronic control system, generally designated 116, which includes a programmable microprocessor 118 (shown hidden). Functions controlled or monitored by the system 116 include the time of day, the amount of gallons treated, the ionic condition of the resin bed, the day of the week, etc., as is well known in the art. Any one of these parameters may be used to trigger the regeneration cycle, which is controlled by the valve 10. As the cam followers 50 are moved along the respective cam tracks 94, 96, the piston rods 74, 44 are linearly moved along a reciprocal axis, which is parallel to the rotational axis of the cam member 78, to selectively open or close specific ports in the eductor body 32 and the main chamber 30.

To provide additional support for the piston rods 44, 74, and specifically the cam followers 50, the valve 10 is provided with a support bracket 120 which has three, preferably integral, support rods 122 which engage the support plate 24 at spherical bearing points 124. A pair of cam follower supports 126 extend parallel to the support rods 122 along the linear path of each of the piston rods 44, 74. Each cam follower support 126 is made of a pair of spaced, parallel bars which are disposed on each side of the cam follower. Thus, as each cam follower 50 is reciprocally moved through rotation of the cam member 78, cam follower slidingly travels between the bars, which prevent misalignment or damage.

Referring now to FIGS. 3 and 5–9, the regeneration cycle of the present valve 10 will be described in greater detail. In FIG. 3, the relative positions of the main and brine pistons 34, 54 during the normal service position, as well as the positions of the regeneration cycle are designated M1–M5, and B1–B5, respectively. In FIGS. 5–9, the actual positions of the pistons 34, 54 are depicted in their respective chambers 30, 32.

Referring now to FIG. 3, in the service position, in which treated water from the softener treatment tank is dispensed through the valve 10 to the plumbing fixtures of the residence or building for use, the brine piston 54 is located at position B1 in the brine cam track 94, and the main piston 34 is located at position M1 in the main cam track 96. A feature of the present cam member 78 is that the dwell points or flat spots 98 are of sufficient length to accommodate residual inertial motion of the motor 102 after it is turned off by the control system 116. Such residual motion is capable of moving the cam follower 50, and the respective piston past its designated position in situations where the dwell point is too short. In addition, the longer length of the dwell points 98 provides a sufficient length of rotational time of the cam member 78 to trigger an appropriate signal duration of at least one of the switches 112, 114. In this manner, the signals are appropriately transmitted to the motor 102 from the electronic control system 116.

Referring now to FIG. 5, raw water passes through the inlet 18 and into the main chamber 30. Lining the chamber 30 is an elongate cage 128 which is a frame-like structure of a plurality of axially spaced rings 130 defining seal ring grooves 132. The seal ring grooves 132 are dimensioned so that when equipped with seal rings 46, the main piston 34 will be slidingly, yet sealingly engaged therein.

In the absence of the main piston 34, there is free communication of water within the main chamber 30 into various ports which open into the main chamber. In the main chamber 30, these ports include the RAW IN port 134, the TANK IN port 136, the DRAIN port 138, the TANK OUT port 140 and the SOFTENER OUT port 142. Thus, in the service position, the flow of water, represented by the arrows 144, passes from the RAW IN port 134 to the TANK IN port 136, from where it is passed into the treatment tank. The rod end 42 of the main piston 34 blocks off the drain port 138, and the narrowed central portion 48 permits fluid communication between the TANK OUT port 140 to the SOFTENER OUT port 142, from where the water passes through the treated water outlet 20. At the blind end 36 of the main piston 34, engagement with the respective ring 130 and the corresponding O-ring prevent water from leaking into a bypass channel 146.

While the valve 10 is in the service position, with the main piston 34 disposed as described above, the brine piston 54 is in the park position. In the park position, ports in the eductor body 32 are closed by O-rings (not shown) located in a plurality of O-ring grooves 148 to prevent any fluid communication between the brine tank and the treatment tank.

Referring now to FIG. 3, since the valve 10 is in the service position for relatively long periods of time, in some cases several days, the O-rings tend to take a set position against the corresponding pistons 34, 54. Once in this set position, the pistons become somewhat stuck and are difficult to move. To help move the pistons from the service position, another feature of the present cam member 78 is that the dwell points associated with the M1 and B1 positions are provided with a relatively shallow inclined portion 150 on the tracks 94, 96 to offer less resistance to the motor 102 as it rotates the cam member 78 against the friction inherent with the pistons 34, 54, rods 44, 74 and cam followers 50. Further, this construction creates less of a load on the motor 102 at start-up after the long service position. In the preferred embodiment, the portion 150 is inclined at about 15°, compared to an incline of about 45° in the inclined portions 100.

In FIG. 3, the arrow 152 represents the direction of rotation of the cam member 78. As such, it will be seen that as the member rotates, once the cam followers 50 engage the inclined portions 150, they will be slightly lifted from the service position prior to being moved to the next, or backwash position.

In the backwash position, which begins the regeneration cycle, backwashing is triggered by the number of treated gallons dispensed, the time of day, or the ionic condition of the resin media in the treatment tank. The cam member 78 is rotated until the main piston 34 is in the position M2 in FIG. 3, and the brine piston 54 is in the position B2. At that point, the cams 110 trigger the switch 112 to stop the motor 102.

Figure 6:
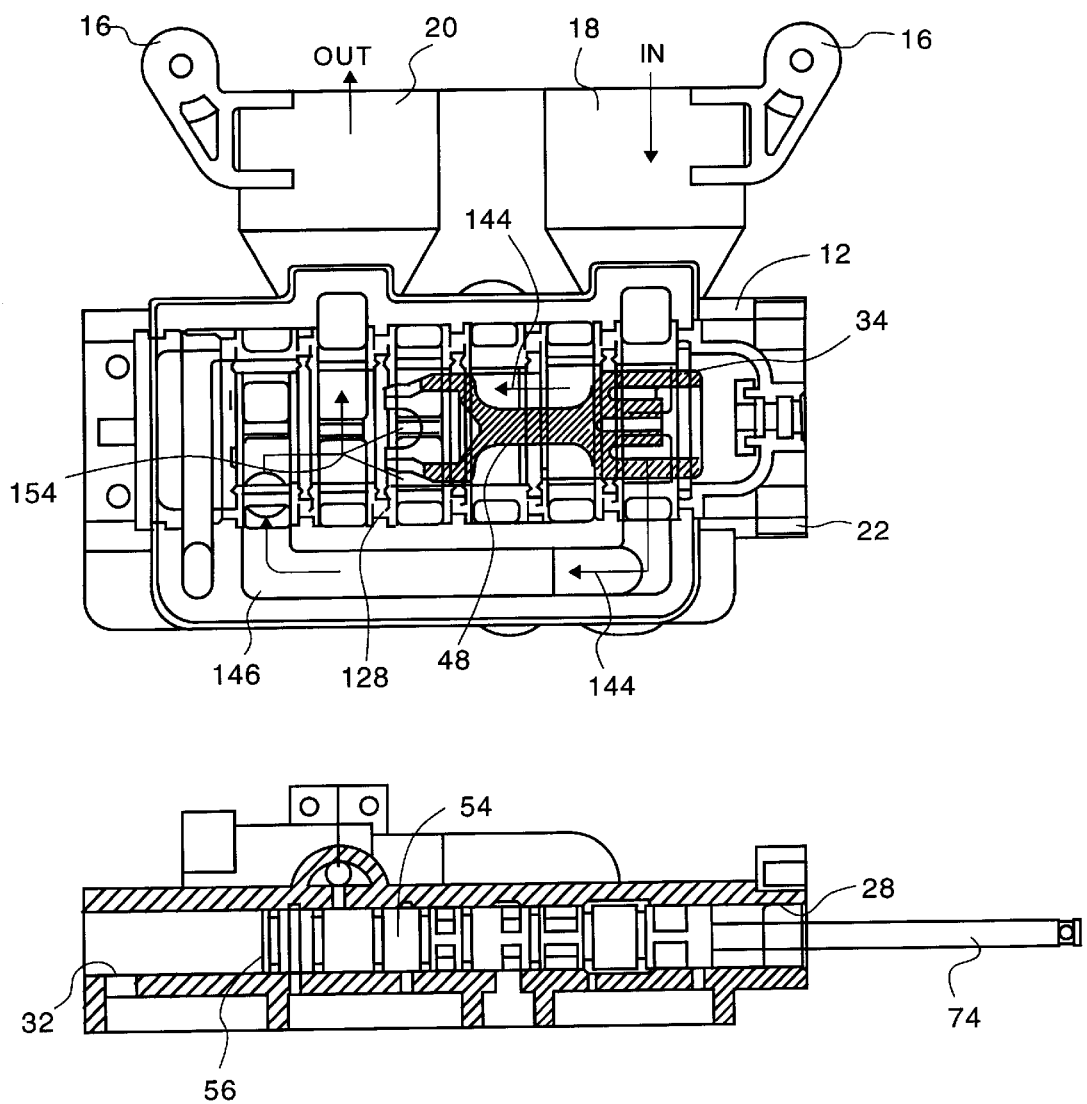
FIG. 6 is a view of the valve of FIG. 5 in the backwash position.

Referring now to FIG. 6 In the backwash position, the brine piston 54 is still in the park position, with all ports blocked. The main piston 34 has been moved so that the raw water entering the valve 10 is diverted to the bypass channel 146 as indicated by the flow arrows 144. At a junction 154, the flow passes through the passages 38 into the TANK OUT port 140 where it flows in a reverse direction through the treatment tank, to flush sediment collected during the service position and to loosen up the resin bed for better brine contact. The flow of water then reenters the main chamber 30 from the TANK IN port 136 and into the DRAIN port 138, which passage is made possible by the narrowed central portion 48 of the main piston 34. The backwash process continues for about 5 to 10 minutes, which time is counted by the electronic control system 116. In the event that the residence needs water during backwashing, the water at the junction 154 may also flow out the SOFTENER OUT port 142.

Referring now to FIG. 3, once the electronic control system 116 determines that the backwash time has expired, it signals the motor 102 to turn the cam member 78 to the eduction/slow rinse position, in which brine from the brine tank is drawn into the treatment tank. Thus, in this position, both pistons 34 and 54 will be moved. The main piston 34 is moved to the position M3 and the brine piston 54 is moved to the position B3.

Figure 7:
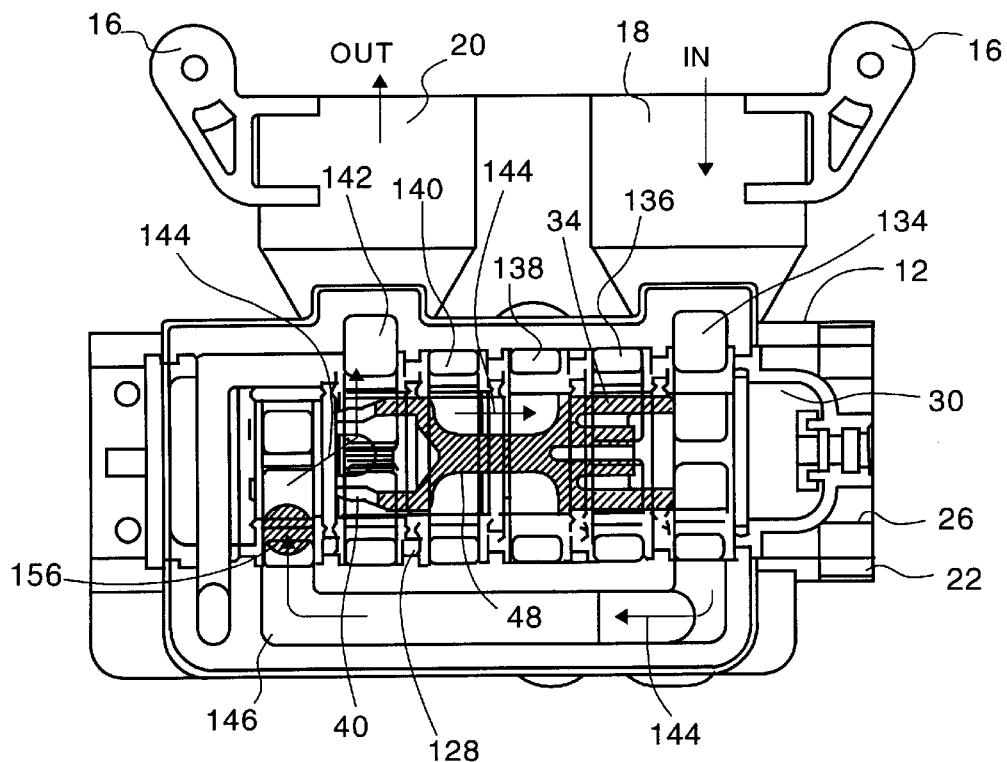
FIG. 7 is a view of the valve of FIG. 5 in the eduction position.
Figure 7:
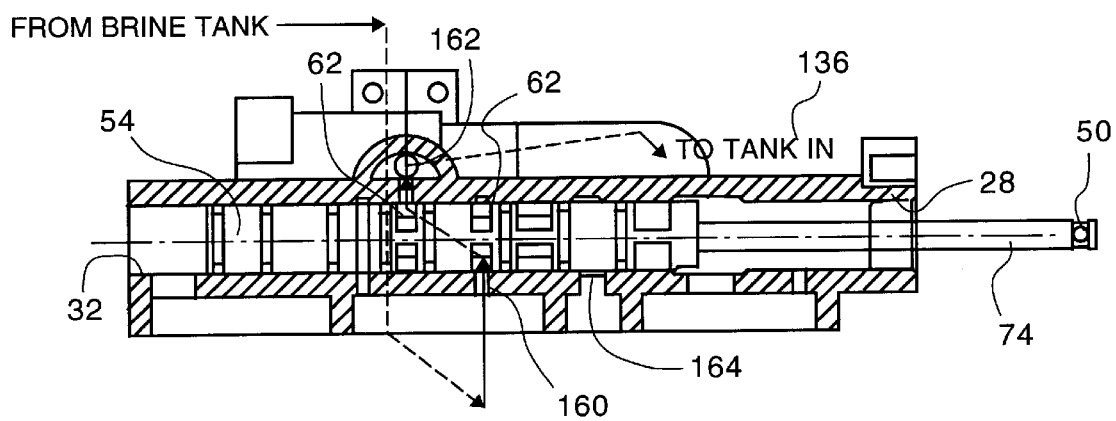

Referring now to FIG. 7, in the eduction/slow rinse position, the main piston 34 is positioned so that raw water entering the RAW IN port 134 enters the bypass channel 146, from where it can flow out the SOFTENER OUT port 142 for use by the residence, even though it is untreated. Also, the central portion 48 of the main piston 34 is positioned so that water can also flow from the TANK OUT port 140 to the DRAIN port 138. Another portion of the main flow in the bypass channel travels to an EDUCTION port 156, where it passes into the eductor body 32.

At the eductor body, an eductor nozzle 158 (best seen in FIG. 1) acts as a siphon, using the main flow of raw water to draw, using suction, brine from the brine tank into the eductor body. In this manner, raw water and brine are mixed as they are passed to the treatment tank.

More specifically, in the eductor body 32, the brine is drawn through an eductor slot 160 into eductor openings 62 on the brine piston 54, and then through other eductor openings 62 into an eductor outlet 162. The eductor outlet 162 is in communication with the TANK IN port 136, where the mixing occurs in the eductor nozzle 158. In the main chamber 30, the mixture of brine and raw water enters the TANK IN port 136, and then regenerates the resin media before it passes through the TANK OUT port 140 and eventually to the DRAIN port 138.

Once the brine tank is emptied, the pistons 34, 54 maintain their positions. In this manner, raw water then flows through the same passages and ports to perform a slow rinse step. This begins to purge the brine from the treatment tank. Due to this dual function, this position is the longest in the regeneration cycle, lasting approximately 60 to 70 minutes.

Referring now to FIG. 3, at the completion of the eduction step, the electronic control system 116 signals the motor 102 to move the cam member 78 once again, this time so that the main piston reaches the position M4, and the brine position reaches the position B4. At this point, the valve 10 is set to begin the fast rinse step. Again, upon a corresponding one of the cams 110 impacting the switch 112, the motor 102 is signalled to stop and hold the member 78 in position.

Figure 8:
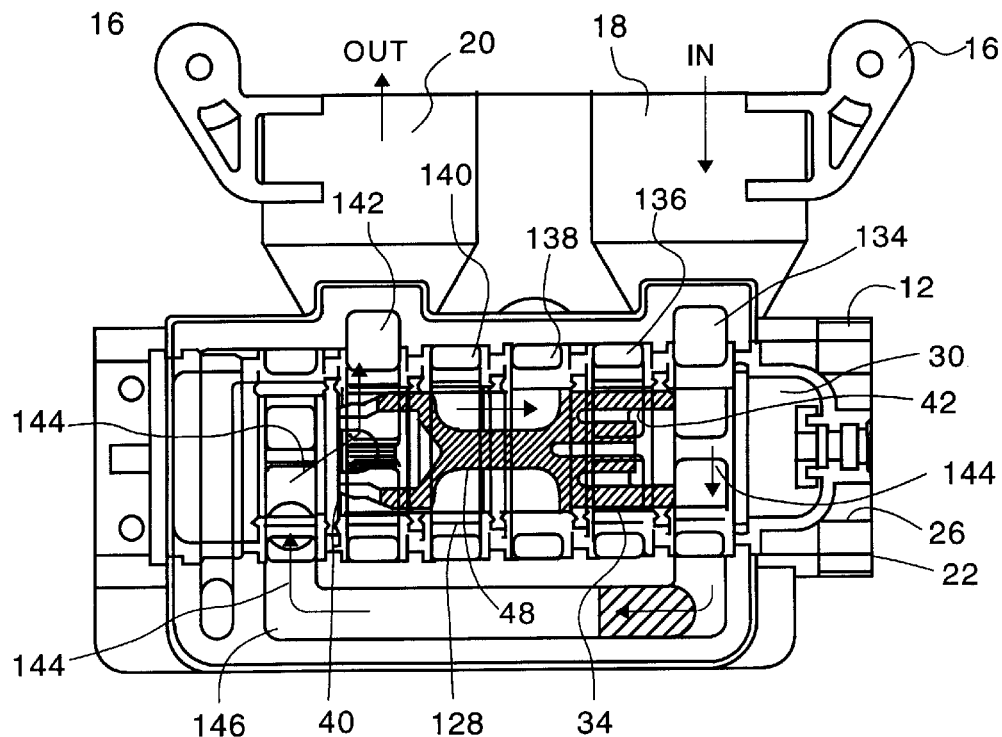
FIG. 8 is a view of the valve of FIG. 5 in the fast rinse position.
Figure 8:
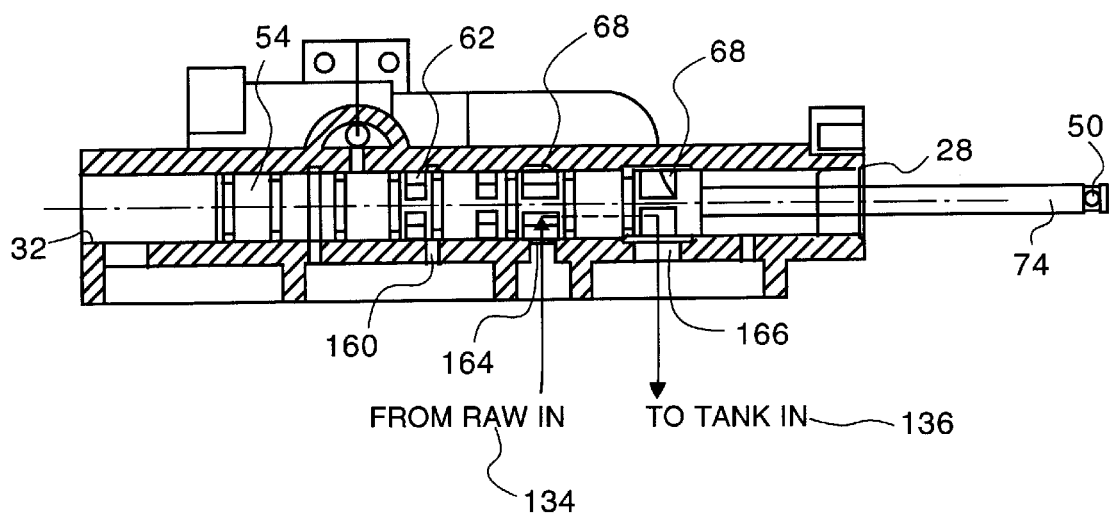

Referring now to FIG. 8, in the fast rinse position, the main piston 34 does not move, but the brine piston 54 moves to the right so that the relatively larger openings 68 are in fluid communication with an EDUCTOR INFLOW port 164, which receives raw water from the RAW IN port 134 of the main chamber 30. The incoming water then passes through the interior of the fast rinse portion 66 of the brine piston 54, until it escapes from other openings 68 and out the EDUCTOR OUTFLOW port 166. The EDUCTOR OUTFLOW port 166 is in fluid communication with the TANK IN port 136.

Raw water from the eductor body 32 then passes into the treatment tank, where it flows from the TANK IN port 136 to the TANK OUT port 140. In this manner, any remaining brine is removed from the resin media and flushed out through the DRAIN port 138 as described above in the eduction step. An important feature of the present valve 10 is that the fast rinse step is controlled by the brine piston 54, which allows the main piston to be stretched axially so that the central portion 48 is elongated, and offers less obstruction to water flow. Thus, the valve 10 provides relatively greater flow rates without requiring an increase in valve size. The fast rinse stage lasts about 5 to 10 minutes. As is the case with the other steps, appropriate cams 110 on the switch cam tracks 106, 108 engage the switches 112, 114 to control the motor 102 which rotates the cam member 78 to the appropriate position.

Referring now to FIG. 3, the next step is called brine refill, in which water is reintroduced into the brine tank to mix with the salt therein and provide a new supply of brine for the next regeneration. With higher flow rates of the present valve 10 as described above, more water passes through the valve. Not only is there a faster rinse of brine from the treatment tank, this last step in the regeneration cycle need only last as long as it takes to refill the brine tank. In prior water softener control systems, the fast rinse and brine refill ran together, which wasted water, since the fast rinse had to run until the brine tank was refilled, and sometimes ran afterward unnecessarily. With the present valve, the brine refill step can be set separately from the fast rinse step.

The electronic control system 116 signals the motor 102 to move until the main piston 34 reaches the position M5, and the brine piston 54 reaches the position B5. The motor 102 will turn the cam member 78 until signaled by the program switch 112 engaging one of the cams 110, indicating that the pistons are in their designated positions.

Figure 9:
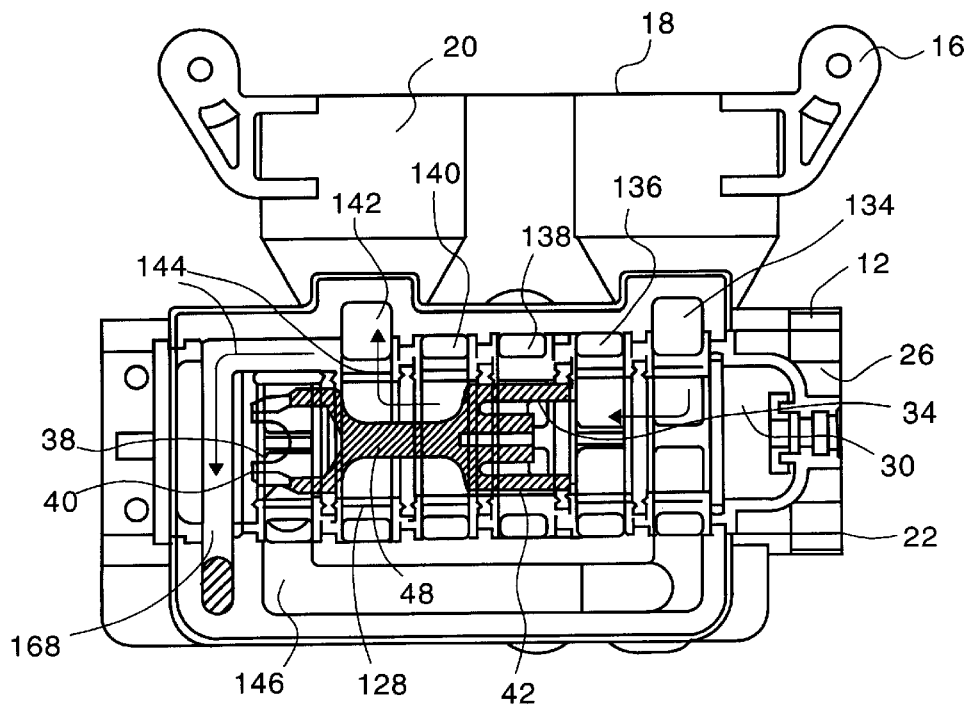
FIG. 9 is a view of the valve of FIG. 5 in the refill position.
Figure 9:
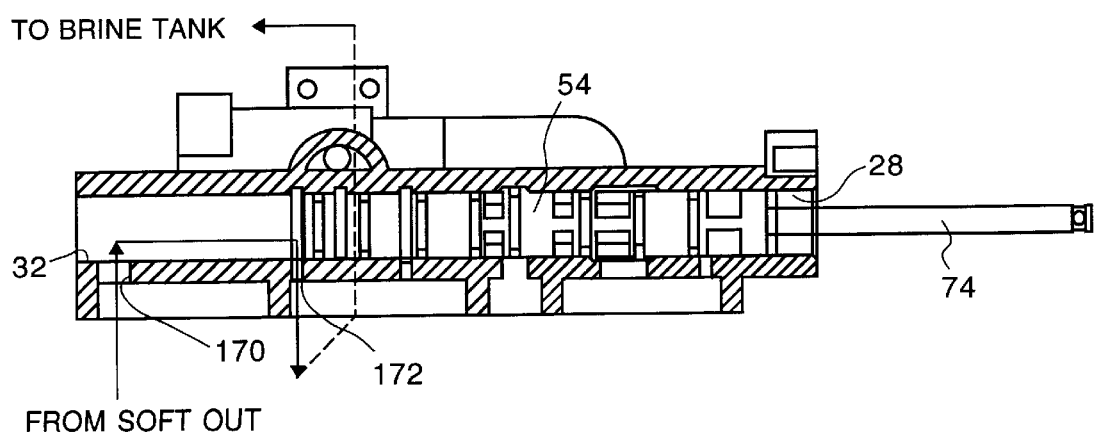

Referring now to FIG. 9, the main piston 34 has been moved to the left so that the DRAIN port 138 is blocked, and raw water entering the main chamber 30 from the RAW IN port 134 passes directly into the TANK IN port 136. Treated or softened water is emitted from the TANK OUT port 140 and ultimately out the SOFTENER OUT port 142. A portion of the SOFTENER OUT water is diverted into a generally "L"-shaped brine refill chamber 168, which is in fluid communication with a brine refill intake port 170 in the eductor body 32. Water flow is indicated by the arrows 144, and flows in a generally inverted "U"-shaped pattern into a brine intake port 172 and ultimately into the brine tank. The duration of this last cycle is controlled by the electronic control system 116. The electronic control system 116 then signals the motor 102 to move the cam member 78 back to the service position. In this manner, the regeneration cycle is completed.

Thus, the present water conditioner valve provides features a cam drive for controlling both the main piston and the brine piston in a single unit, which reduces components, increases efficiency, and provides positive control of the pistons in both operational directions. There is no reliance on spring power for returning the piston to the service position. In addition, the same cam member includes cams for controlling the drive motor 102 to coordinate the motor with the position of the pistons. Another feature is the use of the brine piston to control the fast rinse portion of the regeneration cycle. A benefit of the latter feature is increased flow rates and less wasted water in the refill position.

While a particular embodiment of the dual cam drive for water conditioner valve of the invention has been shown and described, it will be appreciated by those skilled in the art that changes and modifications may be made thereto without departing from the invention in its broader aspects and as set forth in the following claims.

What is claimed is:

1. A water conditioner valve, comprising:
    a main housing configured for providing fluid communication between a plurality of locations, and having first and second valve chambers;
    a main piston mounted for reciprocal movement in said first valve chamber and having a main piston rod attached thereto, said main piston rod provided with a main cam follower;
    a supplemental piston mounted for reciprocal movement in said second valve chamber and having a piston rod attached thereto, said supplemental piston rod provided with a supplemental cam follower; and
    a cam member having an axis of rotation, a first cam track for receiving said main cam follower, and a second track for receiving said supplemental cam follower, said cam tracks being constructed and arranged on said cam member so that rotation of said cam member will cause movement of said pistons along a linear axis which is parallel to the axis of said cam member for controlling the relative positions of said main piston and said supplemental piston in said respective chambers to obtain the desired fluid flow.

2. The valve as defined in claim 1 further including rotation means for rotating said cam member, control means for controlling the operation of said rotation means, and at least one switch cam track on said cam member for indicating the position of said cam member to said control means.

3. The valve as defined in claim 2 wherein said control means includes at least one switch connected to said control means and disposed on said valve to engage said switch cam track so that upon engagement of said cam by said switch, a signal is sent to said control means which is indicative of the position of said cam member.

4. The valve as defined in claim 3 wherein said at least one switch includes a program switch connected to said control means for stopping said cam member at specific cycle points, and a homing switch for signaling said control means when said cam member is in one of a service position and a regeneration position.

5. The valve as defined in claim 1 wherein each said cam track has at least one inclined portion, the angle of inclination of said inclined portion is the result of the balancing of forces caused by motor load, water pressure and seal friction.

6. The valve as defined in claim 1 further including rotation means for rotating said cam member, said cam having at least one switch cam track, each of said first and second cam tracks having at least one inclined portion and at least one flat spot, said at least one flat spot being in registry with a corresponding switch cam on said switch cam track disposed on said cam member, said at least one flat spot having a length which is sufficient to accommodate at least one of extended switch signals and the inertial rotation of the rotation means.

7. The valve as defined in claim 6 wherein at least one of said first and second cam tracks has, on one of said inclined portions, an area of reduced inclination.

8. The valve as defined in claim 1 wherein said first cam track has dwell positions which correspond to service, backwash, eduction and fast rinse positions of said main piston.

9. The valve as defined in claim 1 wherein said second cam track has dwell positions which correspond to service, eduction, fast rinse and refill positions of said supplemental piston.

10. The valve as defined in claim 1 wherein said supplemental piston is a brine piston having a first portion configured for implementing an eduction step, and a second portion configured for implementing a fast rinse step.

11. The valve as defined in claim 10 wherein said brine piston has a rod end and a blind end, and said first portion is disposed at said blind end, and said second portion is disposed at said rod end.

12. The valve as defined in claim 1 wherein the engagement of said cam followers in said respective cam tracks controls movement of said corresponding pistons in both forward and reverse directions.

13. The valve as defined in claim 12 wherein said cam followers are pins passing transversely through said rods, and said valve further includes a guide member having a pair of spaced parallel bars for guiding and supporting said pins as they travel in linear reciprocating movement upon said rods.

14. A water conditioner valve for a water conditioning device having a regeneration cycle, comprising:
    a main housing configured for providing fluid communication between a raw water supply, a treatment tank, a brine tank and a drain, and having a main valve chamber and an eductor body;
    a main piston mounted for reciprocal movement in said main valve chamber and having a main piston rod attached thereto, said main piston rod provided with a main cam follower;
    a brine piston mounted for reciprocal movement in said eductor body and having a piston rod attached thereto, said brine piston rod provided with a brine cam follower; and a cam member having a first cam track for receiving said main cam follower, and a second track for receiving said brine cam follower, said cam tracks being constructed and arranged on said cam member so that rotation of said cam member will control the relative positions of said main piston and said brine piston in said respective main valve chamber and said eductor body to obtain the desired fluid flow.

15. The valve as defined in claim 14 further including rotation means for rotating said cam member, said cam tracks further including a plurality of inclined portions, each pair of such portions being spaced apart by a flat spot, said cam member being provided with at least one switch cam track having at least one switch cam, at least one of said flat spots being in registry with a corresponding one of said at least one switch cam, said at least one flat spot having a length which is sufficient to accommodate at least one of extended switch signals and the inertial rotation of the rotation means.

16. The valve as defined in claim 15 wherein said flat spots on said first cam track are dwell positions which correspond to service, backwash, eduction and fast rinse positions of said main piston.

17. The valve as defined in claim 15 wherein said second cam track has dwell positions which correspond to service, eduction, fast rinse and refill positions of said brine piston.

18. A water conditioner valve for a water conditioning device having a regeneration cycle, comprising:
   a main housing configured for providing fluid communication between a raw water supply, a treatment tank, a brine tank and a drain, and having a main valve chamber and an eductor body;
   a main piston mounted for reciprocal movement in said main valve chamber and having a main piston rod attached thereto, said main piston rod provided with a main cam follower;
   a brine piston mounted for reciprocal movement in said eductor body and having a piston rod attached thereto, said brine piston rod provided with a brine cam follower; and
   a cam member having a first cam track for receiving said main cam follower, and a second track for receiving said brine cam follower, said cam tracks being constructed and arranged on said cam member so that rotation of said cam member will control the relative positions of said main piston and said brine piston in said respective main valve chamber and said eductor body to obtain the desired fluid flow;
   rotation means for rotating said cam member, control means for controlling the operation of said rotation means, and a pair of switch cam tracks on said cam member for indicating the position of said cam member to said control means;
   said control means includes a pair of switches, each connected to said control means and disposed on said valve to engage a corresponding one of said switch cam tracks so that upon engagement of said cam by said switch, a signal is sent to said control means which is indicative of one of the position of said cam member and the state of the conditioner.

19. A water conditioner valve for a water conditioning device having a regeneration cycle including service, backwash, eduction, fast rinse and refill components, comprising:
   a main housing configured for providing fluid communication between a raw water supply, a treatment tank, a brine tank and a drain, said housing having a main valve chamber and an eductor body;
   a main piston mounted for reciprocal movement in said main valve chamber;
   a brine piston mounted for reciprocal movement in said eductor body;
   a control system for manipulating said pistons in said respective chamber and body to achieve the desired fluid flow to complete said regeneration cycle;
   said brine piston being configured to perform at least said eduction and said fast rinse steps of said cycle.

20. The valve as defined in claim 19 wherein said brine piston has a first portion configured for implementing said eduction step, and a second portion configured for implementing said fast rinse step.

21. The valve as defined in claim 20 wherein said brine piston has a rod end and a blind end, and a first portion is disposed at said blind end, and said second portion is disposed at said rod end.

22. The valve as defined in claim 19 wherein said main piston has a main piston rod attached thereto and is provided with a main cam follower, said brine piston has a piston rod attached thereto and is provided with a brine cam follower, and said control system further includes a cam member configured for engaging said cam followers and having a first cam track for receiving said main cam follower, and a second track for receiving said brine cam follower, said cam tracks being constructed and arranged on said cam member so that rotation of said cam member will control the relative positions of said main piston and said brine piston in said respective main valve chamber and said eductor body to obtain the desired fluid flow.

* * * * *